United States Patent Office 3,702,274
Patented Nov. 7, 1972

3,702,274
PROCESS FOR MAKING RIGID POLY-
URETHANE FOAM LAMINATE
Alan Metcalf Wooler, Manchester, England, assignor to
Imperial Chemical Industries Limited, London, England
Continuation-in-part of abandoned application Ser. No.
421,392, Dec. 28, 1964. This application Aug. 4, 1969,
Ser. No. 847,227
Int. Cl. B32b 5/18
U.S. Cl. 156—79                                  8 Claims

ABSTRACT OF THE DISCLOSURE

Process for continuously manufacturing laminated articles having a plastics or resinous foam core sandwiched between and bonded to two outer sheets of facing material in which, after the foam-forming ingredients have been applied to the lower sheet and the two sheets are conveyed in parallel disposition with each other whilst the foam layer is formed between them, and subsequently to the occurrence of not less than 75% of the total expansion of the foam layer but before setting is complete, the components of the laminate are subjected to a predetermined yieldable pressure and conveying motion is imparted to the two sheets under the influence of that pressure. Also apparatus for performing such a process which comprises a foam dispensing means and means for conveying the upper and lower sheets of facing material, the conveying means being such as to exert a predetermined yieldable pressure on the foam at a stage when not less than 75% of the total expansion of its foam has occurred but before setting of the foam is complete.

This invention relates to the manufacture of laminated articles and more particularly to the continuous manufacture of laminated articles having a core of plastics or resinous foam.

This application is a continuation-in-part of our application Ser. No. 421,392 filed Dec. 28, 1964, now abandoned.

By plastics or resinous foam is meant herein a polymeric foam material which is produced from a mixture of chemically-reactive ingredients and other additives which is initially liquid, by a process in which chemical formation of the polymeric substance of the foam accompanies the generation of gas whereby that substance is expanded into a foam structure; the process may if necessary be assisted by the application of heat. Characteristically such materials pass from the initial liquid stage through a stage of increasing viscosity until a weak, deformable gel-like structure is produced, followed by a setting stage in which the material becomes progressively more resistant to deformation as the chemical reaction proceeds to completion. The expansion of the foam occurs chiefly during the first stage up to gelation and to a lesser extent during the initial part of the setting stage.

It is already known to manufacture laminated articles having a plastics or resinous foam core sandwiched between and bonded to two outer sheets of facing material. Machines which have previously been proposed for the continuous manufacture of such laminated articles consist essentially of a conveyor system and a foam dispensing unit. The conveyor system serves to bring the two sheets of facing material into the correct disposition relative to one another and to hold them in this position while the foam core is formed between them. In practice the two sheets of facing material are disposed one above the other and at a distance apart equal to the thickness of foam core which is desired in the final laminated article. Before the sheets are brought into this disposition the foam-forming ingredients are applied to the lower of the two sheets by means of the foam dispensing unit. The sheets are then brought into the correct disposition by means of the conveyor system, and formation and setting of the foam core occurs and may be accelerated by the action of heat.

The conveyor system of such a machine may consist, for example, of upper and lower conveying surfaces, which are parallel to each other and move in co-operation with each other. The conveying surfaces are formed from endless belts of suitable material and are driven in co-operation with each other by some suitable means. The endless belts may be composed of woven fabric or of wire mesh which may if desired be covered with rubber or with a plastic material. The conveying surfaces are backed and supported by platens. Alternatively the conveyor system may consist of upper and lower series of parallel rollers.

The conveyor system, of whatever form, generally performs three functions. The first of these is to bring the two sheets of facing material into proximity, so that the upper sheet makes contact with the layer of foam-forming ingredients deposited upon the lower sheet whilst the surface of the layer is still tacky. The second function is to apply a tractive force to each of the sheets of facing material so that they are caused to move continuously forward at identical speeds. The third function is to regulate the thickness of the finished laminated article, and this has been accomplished hitherto by arranging that there is a gap of fixed width either between the upper and lower conveying surfaces or, where conveying surfaces are dispensed with, between the upper and lower series of parallel rollers. The width of the gap corresponds with the combined thicknesses of the two sheets of facing material and of the foam core in its finished state. The gap thus constitutes a confined region through which the components of the laminated article must pass. During passage through this confined region chemical reactions are taking place in the mixture of foam-forming ingredients leading to the generation of gas, the formation of foam and the setting of the foam. The gas generated within the foam mixture exerts an outward pressure on the two sheets of facing material, but the foam core is unable to expand beyond the limits imposed on the sheets of facing material by the fixed width of the gap. The pressure therefore forces the sheets of facing material into contact with the upper and lower components of the conveyor system and ensures that the latter transmit the necessary traction to the sheets.

The pressure generated within the foam core during its passage through the confined region within the conveying system is influenced by the exotherm of the chemical reactions taking place and by the temperatures obtaining at the interface of the foam and the facing sheets. It is therefore susceptible to fluctuations in the process such as, for example, variations in the composition of the liquid mixture of foam-forming ingredients, variations in the amount of the said liquid mixture applied to the sheet of facing material, variations in the ambient temperature or the temperature of the liquid components, variations in the speed of the passage of the components of the laminated article through the machine and variations in the ambient temperature or the temperature of the liquid components, variations in the speed of the passage of the components of the laminated article through the machine and variations in the amount of heat applied to the said components during their passage through the confined region. In many cases these fluctuations result in the development of excessive pressure, or "overpacking," in that region, with more or less deleterious consequences for the operation of the process and the quality of the laminated articles produced. With a moderate degree of overpacking, there is a tendency for the conveying system to be retarded slightly owing to the increased load imposed upon it. Relief of the excess pressure can come about only through "smearing" of the grain of the foam, that is to say displacement of the cells of the foam from their normal perpendicularly elongated orientation relative to the direction of travel of the components of the laminated article. After such displacement has occurred, stable conditions may be restored for a time, the foam layer once more having its proper thickness and grain, but those parts of the finished laminate in which the transient overpacked conditions occurred are found to have inferior physical properties. There is also a tendency for overpacked foam to expand once it has emerged from the confined region of the conveying system, so that its ultimate thickness may not exactly correspond to the setting of the gap therein.

In more extreme instances of overpacking, displacement of the grain of the foam is not sufficient to release the excessive pressure and, due to the continued reduction in the speed of the conveying system, a thicker layer than normal of the foam-forming ingredients is deposited on the lower facing sheet, so that the effect becomes cumulative. This can lead to a complete seizure of the conveying system, or even of damage to the machine as a result of the considerable pressures generated within it.

Conversely, where fluctuations of the type mentioned above lead to "underfilling," that is to say, a deficiency of foam-forming mixture below that required to give a foam core of the required thickness, there is a tendency for voids to occur between the foam layer and the upper facing, which again results in a product of inferior properties.

The operating conditions within the conveying system of an apparatus with a fixed gap are thus inherently unstable.

We have now devised an improved process for the manufacture of the said laminated articles in which the foam layer, instead of being rigidly confined to predetermined dimensions and thus being susceptible to pressure variations, is subjected to a predetermined yieldable pressure which permits the gap between the upper and lower components of the conveyor system to alter in the event of a major variation in the operating conditions.

According to our invention we provide, in a process for the continuous manufacture of laminated articles having a plastics or resinous foam core sandwiched between and bonded to two outer sheets of facing material which comprises longitudinally conveying a sheet of facing material, applying to the upper surface thereof a layer of a liquid mixture of foam-forming ingredients, longitudinally conveying a second sheet of facing material so that it moves above and in parallel disposition with the first sheet whilst the foam layer is formed between the two sheets and becomes bonded thereto, the improvement which consists in subjecting the components of the laminated article, after the second sheet of facing material has been brought into contact with the layer of foam-forming ingredients and subsequent to the occurrence of not less than 75% of the total expansion of the said layer but before setting of the foam is complete, to a predetermined, yieldable pressure and in imparting conveying motion to the two sheets of facing material under the influence of the said pressure.

By subjecting components of the laminate to a predetermined, yieldable pressure, the effect achieved is that any minor and local variations in the thickness of the foam layer can be controlled and largely eliminated, whilst major variations in thickness affecting appreciable areas of the foam layer can be accommodated without their impeding the longitudinal movement of the components of the laminated article. Such major variations can be controlled by appropriate adjustment of the rate of application of the foam-forming ingredients to the lower sheet of facing material.

It is an essential feature of the present invention that the tractive force required for conveying the upper and lower facing sheets is applied thereto under the influence of the aforesaid predetermined, yieldable pressure, and this in turn requires that the foam layer should be subjected to that pressure when it has risen to not less than 75% of its total final thickness. This follows from the fact that the application of pressure to the mixture of foam-forming ingredients in the early stages of the formation of the foam, before a significant degree of mechanical strength has been developed, is likely to cause a major displacement of the partly risen foam, or even to lead to its collapse. In particular, the application of a tractive force to the two sheets of facing material at this stage is to be avoided, since this may cause shearing of the nascent foam, crinkling of the facing material and the production of a "rolling bank" of foam mixture at the entry to the gap between the upper and lower parts of the conveyor system. Preferably the constant yieldable pressure is applied at a stage when the foam layer has risen to not less than 90% of its total final thickness. It is likewise essential, however, that the predetermined, yieldable pressure should be applied to the components of the laminate before setting of the foam is complete, since otherwise the pressure will be ineffective in controlling any minor variations or irregularities in the thickness of the foam layer and these will remain in the final laminated article.

Preferably the yieldable pressure applied to the laminate components has an average magnitude of from 1 ounce to 5 pounds per square inch, especially from 2 ounces to 10 ounces per square inch. It is not necessary for the pressure to be uniform throughout the whole area over which it is exerted and it may, in fact, be advantageous to subject the components to different pressures as they are progressively conveyed. Having regard to the fact that the foam layer will normally be mechanically somewhat weaker when it first encounters the applied pressure than when it finally leaves its influence, it is preferred that the components of the laminate should be subjected to a continuous or a step-wise increase in the yieldable pressure as they are progressively conveyed.

The pressure applied to the foam core should be capable of adjustment to permit establishment of optimum production conditions for any given type of laminate (i.e. allowing for differences in facing materials or in the thickness or density of the foam layer), that is to say so as to obtain complete filling of the laminate consistent with minimum disturbance of the foam structure and hence optimum physical properties. The optimum setting can readily be found for any given laminating conditions by simple experiment. In practice, the correct setting will achieve complete contact of the upper sheet of facing material to the tacky surface of the foam layer in the course of the last 25% of its rise, thereby displacing any air pockets which might otherwise be trapped in minor depressions in the foam surface, but the applied pressure will not be so high as to displace the foam layer with respect to the lower sheet of facing material upon which it is supported. The thickness of the resulting laminate automatically adjusts itself to a given machine setting, and since this thickness is easily measured it facilitates the initial establishment of the setting required to produce a laminate of particular dimensions. It is possible to continuously display the thickness of the emergent laminate, for example by fitting direct reading thickness gauges at the end of the machine, and so provide a check during continuous operation which allows adventitious changes in thickness, due to variations in any of the factors previously discussed, to be rapidly corrected by manual or automatic adjustment of the rate of dispensing foam materials or the speed of the conveying means.

In carrying out the process of the invention, the components of the laminated article may, if desired, be heated so as to modify the rate of formation and setting of the foam core. Heating may be accomplished by methods already known in themselves. Thus radiant heat may be applied to conveying surfaces which make contact with the sheets of facing material, or it may be applied directly to the facing sheets. Alternatively the conveying surfaces may be backed by heated platens.

The laminated articles with which this invention is concerned have a plastics or resinous foam core sandwiched between and bonded to two outer sheets of facing material. The plastics or resinous foam core may be formed from any suitable foam-forming composition of the type hereinbefore defined and may be either flexible or rigid. It is particularly preferred, however, that the foam core consists of polyurethane. The polyurethane may be obtained in known manner from a suitable mixture of polyurethane-forming ingredients such as polyesters or polyethers containing hydroxyl groups and polyisocyanate together, as desired, with water, catalysts, surfactants, blowing agents and other ingredients. The facing materials may be composed of lengths or sheets of any suitable materials such as, for example, paper, wood, plastic, metal, rubber, paperboard, plasterboard or asbestos. Both of the sheets of facing material may be flexible or both may be rigid and may be the same or different, or one may be flexible and the other rigid.

The present invention also includes apparatus for performing the process hereinbefore described.

Thus according to our invention we also provide apparatus for the continuous manufacture of laminated articles having a plastics or resinous foam core sandwiched between and bonded to two outer sheets of facing material, the apparatus comprising a foam dispensing means for applying a layer of a liquid mixture of foam-forming ingredients to one of the sheets of facing material and a conveying means for causing the said sheet, together with the applied layer, and the second sheet of facing material to move in constant parallel relationship with one another while formation of the foam core takes place between them, the said conveying means being capable of exerting a predetermined, yieldable pressure on the components of the laminate and being so spaced from the foam dispensing means in the direction of travel of the sheets of facing material that the aforesaid pressure is applied subsequent to the occurrence of not less than 75% of the total expansion of the said layer but before setting of the foam is complete.

Preferably the conveying means also constitutes the means whereby the second sheet of facing material is initially brought into contact with the layer of foam-forming ingredients.

The foam dispensing means of the apparatus of our invention, which is used for applying the liquid mixture of foam-forming ingredients to the lower facing material, may be any suitable device for applying the foam-forming ingredients in ready-mixed liquid form. It may, for example, be a mixing and dispensing device such as that described in British Pat. specification No. 913,611 in which mixing and dispensing are brought about by means of compressed air. There may also be used with such a mixing and dispensing device a modified nozzle for providing a more even liquid layer of foam-forming ingredients on the surface of the facing material, such as for example the modified nozzle described in our copending British patent specification No. 1,016,719.

In one embodiment of our invention the conveying means consists of two parts, an upper part and a lower part, so arranged that the lower part is fixed but that the upper part can move up or down with respect to the lower part. This relative motion can be achieved, for example, by arranging for the upper part to be movable in linear bearings or attached to swivel arms.

During the operation of such an apparatus the upper part of the conveying means floats on the components of the laminated article being manufactured, that is to say the packing pressure applied is that developed by the weight of the upper sheet of facing material plus the effective weight of the floating upper part of the conveying means. The effective weight of this part of the conveying means may be varied as desired, for example it may be increased by means of additional weights or ballast, or reduced by the use of counterweights or adjusted either way by spring, hyldraulic or pneumatic loading. By virtue of this floating action, minor irregularities in the surface of the laminate or variations in the thickness of the foam core are eliminated, whilst major variations in thickness can be accommodated by vertical movement of the upper part of the conveying means so as to avoid any obstruction to the continued functioning of the apparatus. Apart from these features, the conveying means may be of one of the types already described, that is to say the upper and/or lower assemblies may contain a conveying surface, for example an endless belt, to impart motion to the corresponding sheet of facing materials, or they may contain parallel rollers which contact the corresponding sheet of facing material. A conveying surface may be backed in its region of contact with the laminated article by a platen, or by a series of parallel rollers as described in British patent specification No. 1,098,472.

In a preferred form of the apparatus of the invention, the upper conveying surface consists of an endless belt which is backed by a platen having longitudinal flexibility, that is to say the platen is flexible in the direction in which the direction in which the components of the laminate pass through the machine. One particular advantage of a flexible platen is that the gap formed between the upper and lower parts of the conveying means is able to respond quickly to changes in thickness of the foam core resulting from deliberate changes in the machine settings, such as a change in the rate of dispensing of the liquid mixture of foam forming ingredients effected in order to control accurately the thickness of the laminate produced. In the case of a platen which was completely rigid in the longitudinal direction, a particular region of the laminate would need to travel the full length of the platen before an abrupt change in thickness was completely levelled. A platen flexible in the longitudinal direction is also capable of accommodating accidental gross changes in thickness such as those caused by a blockage of the foam dispensing means, by a stoppage of the conveying surface or by the presence of an extraneous object in the foam mixture. It is also particularly advantageous when starting up the process, until such time as equilibrium conditions have been established.

Longitudinal flexibility of the platen may be achieved by having it made of a material which is not completely rigid, e.g. relatively thin gauge metal, for example $\frac{1}{10}$ inch thick, stiffened only by rigid lateral cross members. Preferably, however, the flexible platen consists of a longitudinal series of linked plates. Each plate forms a hinged connection with its neighbours, and is also suspended from a fired overhead frame by a swinging linkage which permits a substantial amount of independent vertical movement to each plate. Advantageously each plate is provided with independently adjustable loading means, such as a hydraulic or pneumatic cylinder and piston, also suspended from the fixed frame; the loading means may be adjusted so that the plates exert differential pressures on the individual areas of the upper conveying surface which they act, more particularly so that they exert a progressively increasing pressure upon the conveying surface and, in turn, upon the components of the laminate, in the direction in which the latter travel through the machine.

During the operation of the apparatus of our invention, as has already been stated, the upper part of the conveying means floats on the components of the laminated article. When first starting up the apparatus, however, until such time as the motion of the components of the laminated article through the apparatus has become sufficiently established so that the components can support the upper part of the conveying means, it is necessary to arrange for the said upper part to be supported in some way. This may conveniently be provided for by having for example, a screw or cam lifting arrangement which can be readjusted as soon as the motion of the components of the laminate through the apparatus has been established. Alternatively and more simply the upper floating assembly may be suitably lifted by feeding into the 'nip' a laminate, panel or board of appropriate thickness.

The apparatus of the invention may incorporate means for heating the components of the laminated article during its manufacture in the manner previously described.

The process and apparatus of our invention will now be illustrated by way of example, with reference to the accompanying drawings in which.

Figure 1:
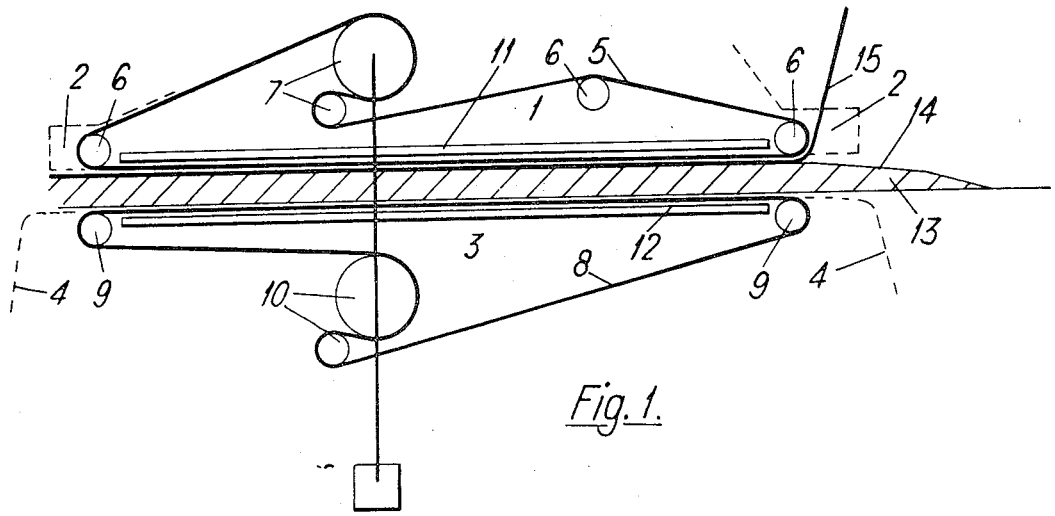
FIG. 1 is a diagrammatic representation showing in side elevation an embodiment of the apparatus in which the upper conveying surface, which rests upon the compronents of the laminate during manufacture, is backed by a single, rigid platen.

Referring to FIG. 1, 1 represents the upper conveying system and 2 represents a part of the frame to which the whole of the upper conveyor is attached; 3 represents the lower conveying system and 4 a part of the frame to which the lower conveyor is attached; 5 represents the conveying surface of the upper conveyor in the form of an endless belt, and 6 represents guide rollers and 7 driving rollers for the belt; 8 represents the similar conveying surface for the lower conveyor and 9 and 10 the corresponding guide rollers and driving rollers respectively; 11 and 12 represent the backing platens for the upper and lower conveyors respectively; 13 represents the lower sheet of facing material for the laminate onto which the mixture of foam-forming ingredients 14 is dispensed which will form the core of the laminate; and 15 represents the upper sheet of facing material for the laminate.

Figure 2:
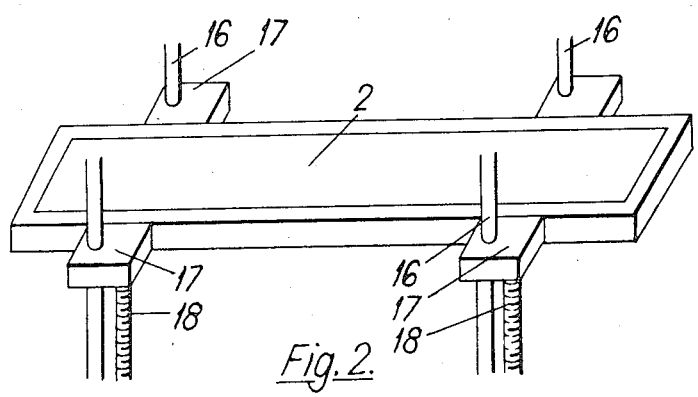
FIGS. 2 and 3 illustrate a lifting arrangement for the upper conveying system of the apparatus of FIG. 1.
Figure 3:
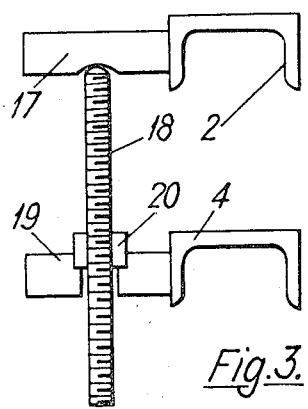

In FIG. 2, 2 represents the frame to which the whole of the upper conveying system is attached; 16 represents vertical pillars fixed to the frame of the lower conveyor; 17 represents brackets mounted on the frame of the upper conveyor 2 in such a way that slight tilting is possible, and through linear bearings in which the vertical pillars 16 pass; and 18 represents two of the four lifting screws bearing on the brackets 17 and attached to the lower conveyor as shown in FIG. 3.

In FIG. 3, 18 represents one of the lifting screws which bears on the bracket 17 and is provided with means of rotation in either direction; 19 represents one of four brackets fixed to the frame 4 of the lower conveyor; and 20 represents a nut engaging with the lifting screw 18 and pinned to the bracket 19. The four lifting screws 18 are interconnected, for example by bevel gears, in such a way that when the upper conveyor is raised or lowered with respect to the lower the two conveyors remain parallel.

In operating the machine, the lifting screws 18 are operated so as to raise the upper conveyor 1 clear of the lower conveyor 3. The conveyor belts 5 and 18 are then started in synchronous motion and foam-forming ingredients 14 are fed on to the lower sheet of facing material 13. When steady operating conditions are achieved, the lifting screws 18 are retracted so as to lower the upper conveyor 1 until it is supported by the laminate and the lifting screws no longer bear on the brackets 17. The force exerted on the laminate is adjusted to the desired constant pressure by applying weights or counter-weights to the upper platen 11.

In the modified apparatus illustrated in FIGS. 4, 5 and 6, the upper conveyor system is indicated generally at 21 and the lower conveyor system at 22; the upper conveyor system is mounted upon a frame indicated generally at 23 which is vertically movable in a manner hereinafter described, and the lower conveyor system is mounted upon a fixed frame indicated generally at 24. The conveying surface of the upper conveyor system is constituted by an endless belt 25 which passes around transverse driving rollers 26 and guiding rollers 27 attached to the frame 23 and is provided with a tensioning device 28. The backing platen for the conveying surface 25 consists of a series of plates 29, each of which extends across the full width of the surface 25. The plates are suspended at each side of the conveyor from links 30 which are pivoted together upon transverse rods 31 (FIGS. 5 and 6), and each adjacent pair of links is in turn suspended at a pivot 31 from the frame 23 by hinged levers 32. Each transverse rod 31 is attached centrally by a connecting rod 33 to a piston (not shown) moving in a pneumatic cylinder 34; the cylinders 34 are secured to the frame 23. By admission or exhaust of air to or from the cylinders 34, the corresponding plates 20 may be lowered or raised by a total distance of approximately 1 inch. The plate 29a which is situated at the forward extremity of the series (as seen at the extreme right in FIG. 4) has rigidly attached to it a further transverse guiding roller 35 against which the conveyor belt 25 passes; the forward end of the plate 29a is carried in journals (not shown) permitting free vertical movement. The frame 23, together with the various components of the upper conveyor system which are attached thereto as just described, is supported by a lifting assembly as previously described with reference to FIGS. 2 and 3 (the lifting assembly is not shown in FIG. 4) ,whereby the entire conveyor system may be raised or lowered with respect to the lower conveyor system 22 to accommodate different thicknesses of laminate.

The lower conveyor system has a conveying surface constituted by an endless belt 36 which passes around transverse driving rollers 37 and guiding rollers 39 and is provided with a tensioning device 39. The backing platen for the surface 36 consists of a single rigid plate 40 which extends across the full width and along the full length of the upper run of the belt and is fixed to the frame 24. The apparatus also includes a foam mixing and dispensing unit 41 supported from a transversing mechanism (not shown).

When the apparatus is in operation, the conveying surfaces 25 and 36 are driven at equal speeds in the directions indicated by the arrows and transport upper and lower sheets of facing material 42 and 43 respectively. A layer of ingredients 44 for forming a foam core is dispensed from the mixing head unit 41 on to the lower facing sheet 43. The layer expands as reaction between the ingredients occurs, and the speed of the conveying surfaces is selected so that when the layer has expanded to about 90% of its full extent, the layer enters the gap between the upper and lower conveying systems 21 and 22. At this point the upper facing sheet 42 is applied to the surface of the foam layer by pressure from the roller 35 attached to the plate 29a. This pressure derives partly from the weight of the plate 29a and partly from the action of the cylinder 34a, which are adjusted to give a net forward force against the upward component of the tension of the conveyor belt 25. The components of the laminate then pass progressively forward, contained by the conveying surfaces 25 and 36, and are subjected to yieldable pressure from the series of plates 29, whereby the thickness of the foam layer is controlled as its expansion proceeds to completion and setting commences. The laminate emerges from the rearward end of the conveying system in a substantially set condition. In practice, the pressures exerted by the plates 29 are graded from about 4 oz./sq. in. at the forward end of the conveying system to about 8 oz./sq. in. at the rearward end. When commencing a run, the upper conveying system is lowered by means of the lifting assembly until the gap between the conveying surfaces 25 and 36 is about ½" less than the required final thickness of the foam layer. The precise thickness of the layer can then be controlled, within the by the excessive pressure developed within the conveying system. The increasing tendency of the foam layer to expand after emergence from the conveying system as the degree of overpacking increases is also shown by the results of thickness measurements, demonstrating that the use of a fixed gap does not in fact produce a constant thickness of laminate.

TABLE 1.—VARIATION OF MEAN PHYSICAL PROPERTIES OF CONTINUOUS LAMINATE DURING A RUN—"FLOATING PLATEN" MACHINE

| Time from start of run (hr.) | Thickness (in.) | Density (lb./cu. ft.) | Compression strength [1] (lb./sq. in.) | Compression modulus [1] (lb./sq. in.) | Dimensional stability [2] | | | |
|---|---|---|---|---|---|---|---|---|
| | | | | | $-15°$ C. | $20°$ C. | $70°$ C. | $100°$ C. |
| 0.25 | 1.20 | 1.90 | 25.6 | 560 | 100 | 100 | 100 | 101 |
| 0.50 | 1.26 | 1.98 | 27.0 | 681 | 100 | 100 | 100 | 101 |
| 0.75 | 1.25 | 1.92 | 26.3 | 681 | 100 | 100 | 100 | 100 |
| 1.00 | 1.24 | 1.93 | 27.2 | 650 | 100 | 100 | 100 | 100 |
| 1.50 | 1.26 | 1.92 | 24.0 | 625 | 100 | 100 | 100 | 100 |
| 2.00 | 1.23 | 1.85 | 23.7 | 730 | 101 | 100 | 100 | 100 |
| 3.00 | 1.22 | 1.90 | 25.4 | 775 | 101 | 100 | 100 | 102 |
| 4.00 | 1.26 | 1.85 | 24.7 | 575 | 100 | 100 | 100 | 101 |

[1] Measured perpendicular to facing sheets.
[2] Percentage change in the area of a section of laminate measuring 12 in. x 2 in. when maintained for 14 days at the temperature stated. (Initial value=100.)

TABLE 2.—VARIATION OF MEAN PHYSICAL PROPERTIES OF CONTINUOUS LAMINATE WITH CONVEYOR SPEED—"FIXED GAP" MACHINE

| Conveyor speed, ft./min. | Filling | Average foam thickness, inches | Density, lb./cu. ft. | Compression strength [1] (lb./sq. in.) | Compression modulus [1] (lb./sq. in.) | Dimensional stability [2] | | | |
|---|---|---|---|---|---|---|---|---|---|
| | | | | | | $-15°$ C. | RT | $50°$ C. | $100°$ C. |
| 3.1 | Under | 0.907 | 2.22 | 23.4 | 518 | | | | |
| 3.0 | Sl. under | 0.917 | 2.22 | 22.6 | 465 | 100 | 100 | 100 | 102 |
| 2.9 | Satisfactory | 0.918 | 2.31 | 19.2 | 395 | 100 | 100 | 100 | 103 |
| 2.8 | do | 0.941 | 2.34 | 18.7 | 322 | | | | |
| 2.7 | do | 0.965 | 2.39 | 15.4 | 269 | | | | |
| 2.6 | do | 0.971 | 2.46 | 13.1 | 266 | 100 | 100 | 100 | 112 |
| 2.5 | do | 0.992 | 2.49 | 12.5 | 199 | | | | |
| 2.4 | do | 1.010 | 2.44 | 10.6 | 202 | | | | |

[1] Measured perpendicular to facing sheets.
[2] Percentage change in the area of a section of laminate measuring 12 in. x 1 in. when maintained for 14 days at the temperature stated (initial value=100).

1" free movement of the plates 29, by appropriate control of the speed of the conveying surfaces 25 and 36 and/or the rate of application of the foam-forming ingredients by reference to continuous display of the thickness of laminate being produced, measured by the lift of a selected plate 29 located about half way along the series.

Figure 4:
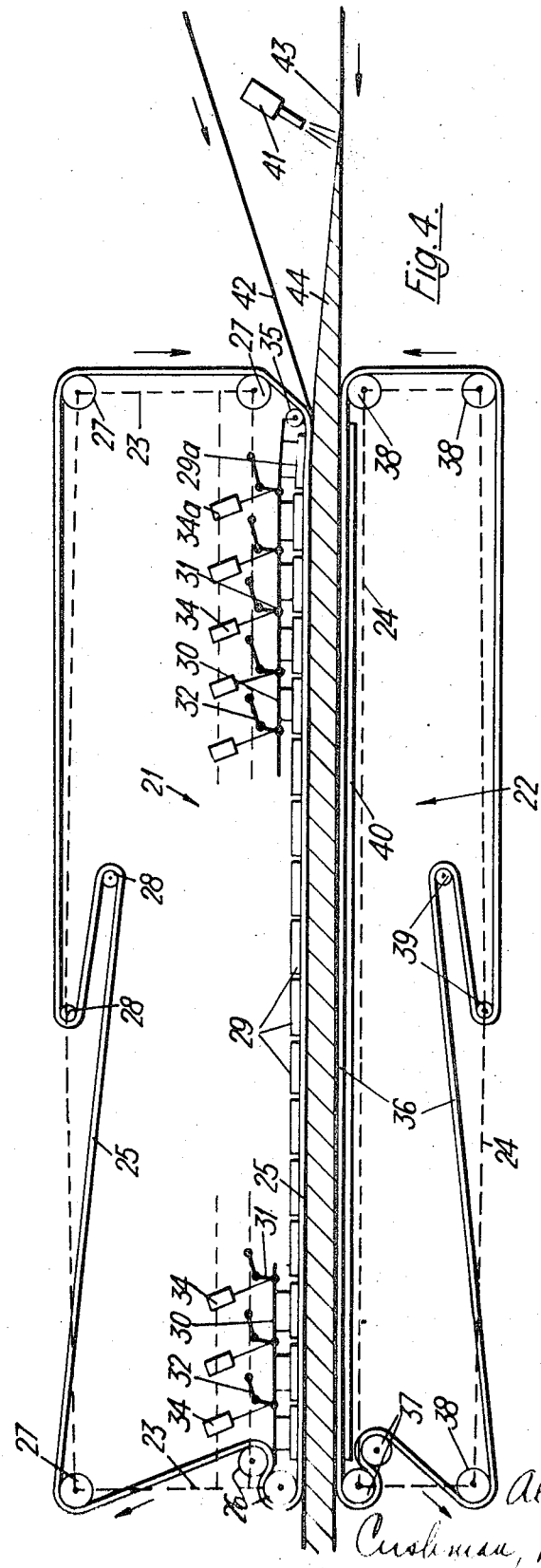
FIG. 4 is a diagrammatic representation showing in side elevation a modification of the apparatus of FIG. 1 in which the upper conveying surface is backed by a platen consisting of a series of longitudinally linked plates.
Figure 5:
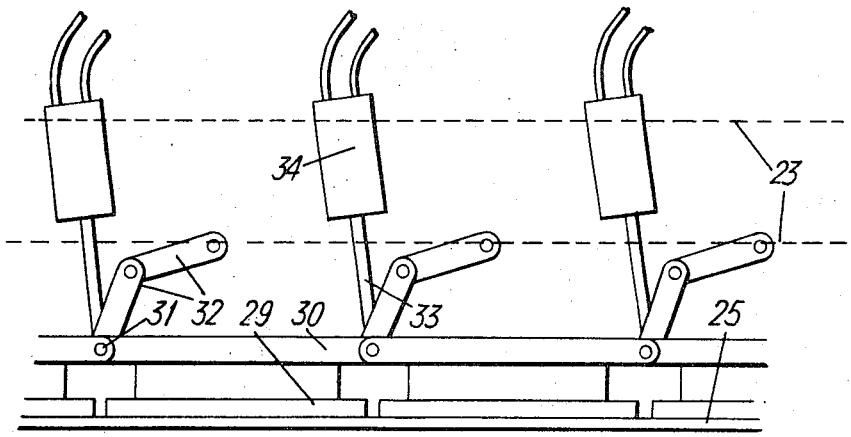
FIG. 5 shows in side elevation in greater detail a part of the platen construction shown in FIG. 4.
Figure 6:
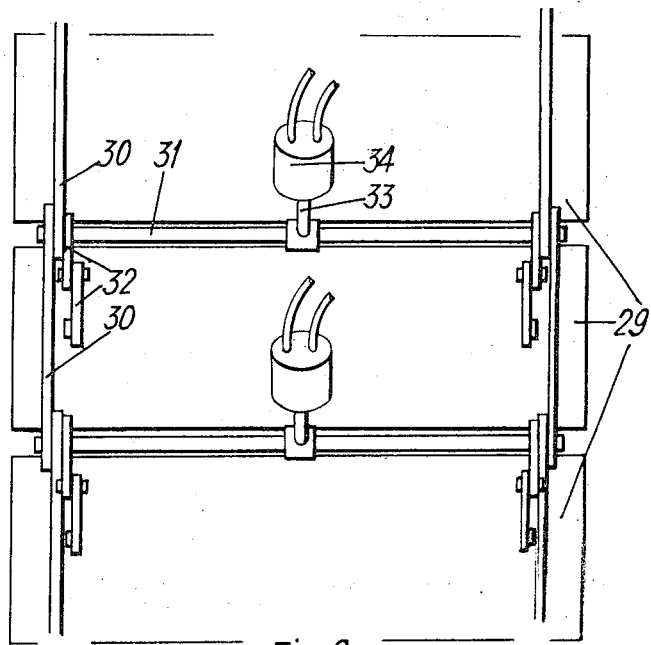
FIG. 6 is a partial plan view corresponding to FIG. 5.

The operation of the apparatus of the invention is further illustrated by the data presented in Table 1, which are the results of observations carried out periodically during a four-hour production run on a machine of the type shown in FIGS. 4, 5 and 6 and of physical tests performed on samples of the laminated articles so produced. The facing materials employed, both upper and lower, were thin paper of 30" width and the foam-forming composition was based on a polyether polyol and crude diphenylmethane diisocyanate, blown substantially with trichloromonofluoromethane. Once the run had been commenced, no alterations to the machine settings or the variables were made other than occasional minor adjustments of conveyor speed required to correct small variations in the thickness of the laminate. It will be seen from the results displayed that excellent constancy of properties of the product were maintained throughout the run. For the purpose of comparison, corresponding results are shown in Table 2 for a run employing similar facing materials and foam-forming composition carried out on an apparatus of the prior art type, in which the gap between the upper and lower conveying surfaces is fixed. In order to produce artificially the conditions of excessive overpacking which can occur in such an apparatus, the speed of the conveyor system was progressively lowered during the course of the run, so as to produce a gradual build-up in the thickness of the layer of foam-forming ingredients deposited upon the lower facing sheet. The speed was not reduced to the point where passage of the components of the laminate through the conveying system was altogether impeded, but the results show clearly the marked deterioration in the physical properties of the foam layer, in particular the compression strength measured perpendicular to the facings and the dimensional stability, which occurred as a consequence of "smearing" of the grain of the foam

I claim:

1. In a process for the continuous manufacture of laminated articles having a core of rigid polyurethane sandwiched between and bonded to two outer sheets of facing material which comprises longitudinally conveying by means of lower conveying means a sheet of facing material, applying to the upper surface thereof a layer of a liquid mixture of polyurethane foam-forming ingredients, longitudinally conveying a second sheet of facing material between the layer of foam-forming ingredients and an upper conveying means so that the second sheet moves above and in parallel disposition with the first sheet whilst the foam layer is formed between the two sheets and becomes bonded thereto, the improvement which consists in subjecting the components of the laminated article, after the second sheet of facing material has been brought into contact with the layer of foam-forming ingredients and subsequent to the occurrence of not less than 75% of the total expansion of the said layer but before setting of the foam is complete, to a predetermined, yieldable pressure exerted by the conveying means and in imparting conveying motion to the two sheets of facing material under the influence of the said pressure.

2. A process as claimed in claim 1, wherein the components of the laminated article are subjected to the predetermined, yieldable pressure subsequent to the occurrence of 90% of the total expansion of the foam layer.

3. A process as claimed in claim 1, wherein the yieldable pressure applied to the components of the laminated article has an average value of from 1 ounce to 5 pounds per square inch.

4. A process as claimed in claim 3, wherein the yieldable pressure has an average magnitude of from 2 ounces to 10 ounces per square inch.

5. A process as claimed in claim 1, wherein the components of the laminate are subjected to different pressures as they are progressively conveyed.

6. A process as claimed in claim 5, wherein the components of the laminate are subjected to increasing yieldable pressure as they are progressively conveyed.

7. A process as claimed in claim 1 wherein the liquid mixture of foam-forming ingredients comprises a polyurethane-forming mixture of a hydroxyl group-containing ingredient and a polyisocyanate.

8. A process as claimed in claim 1 wherein the sheets of facing material are constructed of a material selected from the group consisting of paper, wood, plastics, metal, rubber, paper board, plaster board and asbestos.

References Cited
UNITED STATES PATENTS

| | | | |
|---|---|---|---|
| 3,037,897 | 6/1962 | Pelley | 156—79 X |
| 3,094,449 | 6/1963 | Sisson | 264—47 X |
| 3,180,778 | 4/1965 | Rinderspacher et al. | 156—79 UX |
| 3,208,103 | 9/1965 | Voelker | 264—47 X |
| 3,231,439 | 1/1966 | Voelker | 264—47 X |
| 3,233,576 | 2/1966 | Voelker | 156—79 X |
| 3,240,846 | 3/1966 | Voelker | 264—47 |
| 3,249,661 | 5/1966 | Willy | 264—54 |
| 3,354,503 | 11/1967 | Joseph et al. | 264—47 X |
| 1,484,311 | 2/1924 | Tischer | 156—446 |

BENJAMIN A. BORCHELT, Primary Examiner

G. E. MONTONE, Assistant Examiner

U.S. Cl. X.R.

264—47